April 21, 1925.
W. H. SARGENT
TRACTOR
Filed July 15, 1922
1,534,329
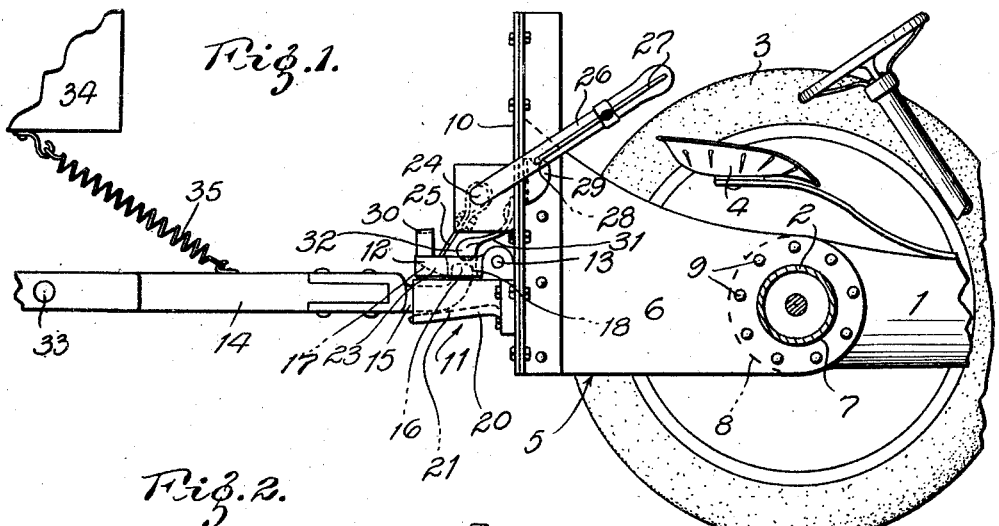
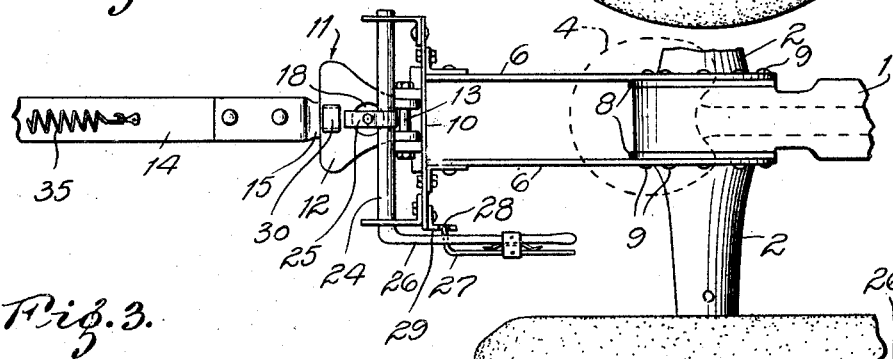
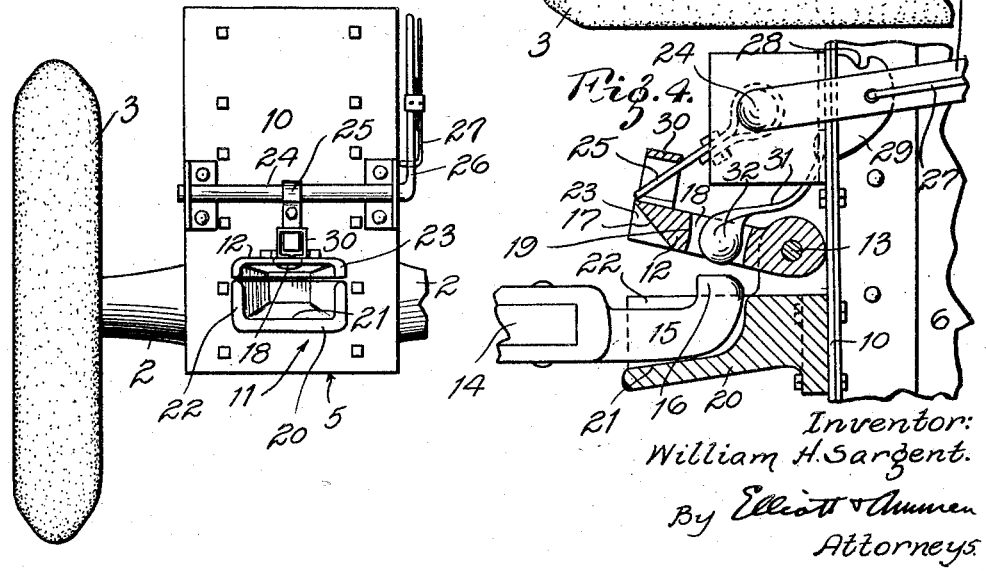
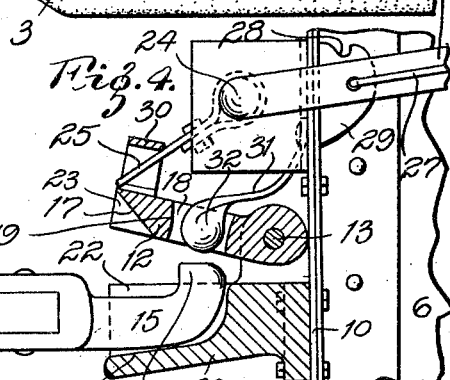
Inventor:
William H. Sargent.
By Elliott & Ammen
Attorneys.

Patented Apr. 21, 1925.

1,534,329

UNITED STATES PATENT OFFICE.

WILLIAM H. SARGENT, OF WEBSTER GROVES, MISSOURI, ASSIGNOR OF ONE-THIRD TO GEORGE RIXMANN AND ONE-THIRD TO JULIUS SEIDEL, BOTH OF ST. LOUIS, MISSOURI.

TRACTOR.

Application filed July 15, 1922. Serial No. 575,204.

*To all whom it may concern:*

Be it known that I, WILLIAM H. SARGENT, a citizen of the United States, residing in the city of Webster Groves and State of Missouri, have invented new and useful Improvements in Tractors, of which the following is a specification.

This invention relates to tractors and the general object of the invention is to provide a tractor with means which will enable the same to be readily coupled to a trailer, and to provide at the same time for the safety of the driver of the tractor; also to provide a coupling device which will operate automatically to couple the trailer to the tractor simply by backing the tractor toward the trailer; also to provide means for readily releasing the trailer and for preventing accidental uncoupling of the trailer from the tractor. While features of the invention are applicable in many situations, for the purpose of illustration, I have described the invention as applied to a tractor which is used in a lumber yard for shifting loads of lumber from place to place. And the invention is expected to have its greatest usefulness as an industrial tractor in similar circumstances where the tractor can be used quickly to effect the movement of loads about an industrial plant.

Further objects of the invention will appear hereinafter.

The invention consists in the novel features, and in the general combination of parts to be particularly described hereinafter, all of which contribute to produce a simple and efficient tractor. A preferred embodiment of my invention will be particularly described in the following specification, while the broad scope of my invention will be pointed out in the appended claims.

In the drawing—

Figure 1 is a side elevation broken away, showing the rear end of a tractor and the forward end of a trailer, embodying my invention;

Figure 2 is a plan of parts shown in Figure 1, but with one side of the axle housing broken away;

Figure 3 is a rear elevation of the tractor with one of the axle housings broken away;

Figure 4 is a vertical section through the coupling device upon an enlarged scale and showing contiguous parts of the tractor in elevation.

The illustration of my invention shows the same as applied to a tractor which has been already built. This tractor comprises a main frame 1, the rear end of which is provided with axle housings 2 which carry the rear wheels 3 of the tractor.

In applying my invention to such a tractor, it is not only necessary to provide for effecting the coupling to the trailer, but it is imperative that the construction should insure perfect safety of the driver of the tractor on the seat 4 of the machine. In order to provide a rigid support for the coupling device and also to insure the safety of the driver, I provide the frame 1 with a rear extension or extension frame 5 which may comprise two oppositely disposed plates 6. These plates may be readily attached to the frame 1 by providing an opening 7 at the forward end of each plate through which the adjacent axle housing 2 passes, and the forward ends of these plates may seat upon the outer sides of the flanges 8 of these axle housings, being secured in place by the extra long bolts or rivets 9 which can be secured in the rear end of the frame 1. In other words, in order to attach my improvement, it is merely necessary to remove the regular bolts or rivets at this point and substitute longer ones which are sufficiently long to provide for the increased thickness due to the presence of the plates 6.

These plates 6 support a transversely disposed guard plate 10 which is disposed in a vertical position behind the driver's seat. This plate 10 should be secured to the plates 6 by any substantial connection which will insure rigidity, and the plate itself should be sufficiently strong to prevent any possibility of its being broken or punctured by the forward end of a trailer tongue in coupling the trailer to the tractor.

On the rear side of the plate 10, I provide a coupling device 11 which includes a movable jaw 12 which is mounted so as to swing away from its normal position when the same is engaged by the co-operating coupling member or tongue carried on a trailer.

I prefer to mount the movable jaw so that it can swing up on a forwardly disposed pivot 13 and this jaw normally lies in a substatnially horizontal position, such as illustrated in Figure 1. This movable jaw and the coupling member on the trailer with which it co-operates, are so constructed that when the coupling member of the trailer strikes the jaw, it will displace it, in the present instance, in an upward direction. The coupling member operates to return to its normal position, in the present instance, by gravity; the movable jaw is constructed with means to engage the co-operating coupling member so as to prevent the same from being withdrawn from the coupling device.

In order to accomplish this, the trailer may be provided with a short wagon tongue 14, the forward end of which may be provided with a coupling tongue 15. This tongue has an upwardly extending spur 16 at its forward end which strikes the rear end of the movable jaw 12 and raises the same so as to enable the tongue to move forward into its coupling position. In order to facilitate the upward movement of the movable jaw 12, the same is provided with an inclined guide-face 17 (see Figure 4). As the forward side of the spur 16 strikes this inclined face, it raises the jaw and the jaw then falls back by gravity into a horizontal position. The jaw is provided with means which will permit it to do this, and which, at the same time, will engage the rear side of the spur 16. For this purpose, it is merely necessary to provide the movable jaw with an opening 18 which will receive the spur 16, and the rear edge 19 of which will fall into place behind the spur 16.

In order to facilitate the guiding of the tongue 15 into the coupling device, I prefer to provide a relatively fixed jaw 20 which presents an inclined bottom wall 21 and inclined side walls 22. The upper or movable jaw 12 is also provided with side walls or flanges 23 so that the movable jaw and the fixed jaw co-operate to produce a tapered guide or relatively wide mouth which can be readily struck by the driver in backing the tractor against the tongue 15.

In order to enable the trailer to be uncoupled at will, I provide suitable means for displacing or lifting the movable jaw, and I prefer to construct this means in such a way that it can operate as a lock to prevent the accidental lifting of the movable jaw. For this purpose, I provide a transverse shaft 24 carrying a rigidly secured arm 25. I provide means for locking this arm 25 with its end disposed against the upper face of the movable jaw. For this purpose, I provide a lever 26 for rocking the shaft 24 and this lever is provided with a hand-operated locking bolt 27 which may co-operate with a locking socket 28 in a fixed plate 29 (see Figure 1).

In order to enable this same arm 25 to raise the movable jaw at will, I provide means on the jaw for engaging the arm when the arm is swung in an upward direction. For this purpose, I may simply provide a shackle or yoke 30 which is engaged by the arm as it swings upwardly (see Figure 4).

I have found in practice that in drawing the trailer over rough ground, there is a tendency for the tongue 15 to rise, thereby tending to lift the movable jaw and place a great strain on the locking arm 25. In order to overcome this tendency, and prevent the tongue from rising this way, I prefer to provide a stop device 31 which is in the form of a bent metal bar rigidly secured to the rear face of the plate 10 and extending downwardly, being provided with an enlarged head 32 at its lower end which lies in the opening 18, and just above the upper end of the spur 16 when it is in its normal coupling position. This stop 31 does not interfere in any way with the coupling movement, but does prevent the accidental lifting of the movable jaw by the tongue 15.

In practice, it is also advisable that the trailer tongue 14 should not be rigidly held in position, but I prefer to secure it by a pivotal connection 33 near the forward end of the trailer body 34, and I provide a spring 35 which counterbalances the weight of the tongue 14, or holds the same against a stop; in other words, the trailer tongue 14 should have some flexibility in a vertical plane so that its horizontal position does not depend entirely upon the relative position of the trailer and the tractor with respect to the grade of the road; that is to say, the tractor could be going down grade while the trailer be going up grade, without the trailer tongue tending to pry itself out of the coupling device. To this end, the trailer tongue is characterized by the flexibility of its connection and is not rigid with the trailer chassis or body.

It is understood that the embodiment of the invention described herein is only one of the many embodiments my invention may take, and I do not wish to be limited in the practice of my invention nor in my claims, to the particular embodiment set forth.

What I claim is:—

1. In a tractor, the combination of a frame, a driver's seat supported thereupon, said frame having an extension projecting rearwardly, and having a transversely disposed guard behind the driver's seat, a coupling device disposed at the rear side of the said guard, and means within reach of the driver's seat for controlling the coupling device.

2. In a tractor for coupling to a trailer, the combination of a frame, a coupling device supported at the rear of the frame comprising a fixed jaw, and a movable jaw mounted so as to swing upwardly at its rear portion, the rear portion of said jaw having an inclined guide-face, a coupling tongue to be attached to the trailer and extending substantially horizontally forward, said tongue having an upwardly extending spur adapted to engage the guide-face and lift the jaw, said jaw having an opening beyond the inclined face for engaging over the spur of the tongue and permitting the jaw to fall by gravity back to its normal position, and co-operating with the tongue thereafter to prevent its withdrawal and a fixed stop located over said opening and adapted to be engaged by said spur for preventing undue upward movement of said tongue.

3. In a tractor for coupling to a trailer, the combination of a frame, a driver's seat supported thereupon, said frame having an extension projecting rearwardly and having a transversely disposed guard-plate behind the driver's seat, a coupling device having a relatively movable jaw with a guide face adapted to be engaged by a coupling tongue on the trailer so as to be displaced thereby from its normal position, and operating to return automatically to its normal position, said jaw having means co-operating with the coupling tongue when in its normal position to prevent withdrawal of the tongue, and hand-operated means mounted on said guard plate and in reach of the driver for moving the jaw to release the coupling tongue.

4. In a tractor for coupling to a trailer, the combination of a frame, a coupling device supported at the rear of the frame having a movable jaw mounted so as to swing upwardly at its rear portion, the rear portion of said jaw having an inclined guide-face, a coupling tongue to be attached to the trailer and extending substantially horizontally forward, said tongue having an upwardly extending spur adapted to engage the guide-face and lift the jaw, said jaw having an opening beyond the inclined face to permit the jaw to fall by gravity back to its normal position, said opening having an edge to engage the rear side of the tongue thereafter to prevent its withdrawal, and a fixed stop secured to the frame and extending down into the said opening so as to lie adjacent to the end of the said spur and operating to limit the upward movement of the spur.

5. In a tractor for coupling to a trailer, the combination of a frame, a coupling device supported at the rear of the frame having a movable jaw mounted so as to swing upwardly at its rear portion, the rear portion of said jaw having an inclined guide-face, a coupling tongue to be attached to the trailer and extending substantially horizontally forward, said tongue having an upwardly extending spur adapted to engage the guide-face and lift the jaw, said jaw having means beyond the inclined face for engaging the said spur and permitting the jaw to fall by gravity back to its normal position, said means co-operating with the spur thereafter to prevent the withdrawal of the tongue, an arm independent of said jaw rotatably mounted on said frame above the movable jaw, and an operating lever accessible to the driver for moving said arm into the path of the movable jaw so as to cause it to operate as a stop to prevent the same from being lifted accidentally after it has dropped into engagement with the spur.

6. In a tractor for coupling to a trailer, the combination of a frame, a coupling device supported at the rear of the frame having a movable jaw mounted so as to swing upwardly at its rear portion, the rear portion of said jaw having an inclined guide-face, a coupling tongue to be attached to the trailer and extending substantially horizontally forward, said tongue having an upwardly extending spur adapted to engage the guide-face and lift the jaw, said jaw having means beyond the inclined face for engaging the said spur and permitting the jaw to fall by gravity back to its normal position, said means co-operating with the spur thereafter to prevent the withdrawal of the tongue, an arm rotatably mounted on said frame above the movable jaw and movable into the path of the movable jaw so as to operate as a stop to prevent the same from being lifted accidentally after it has dropped into engagement with the spur, and means carried by the movable jaw for engaging said arm to enable the arm to lift the movable jaw to release the tongue.

7. In a tractor for coupling to a trailer, the combination of a frame, a coupling device supported at the rear of the frame having a movable jaw mounted so as to swing upwardly at its rear portion, the rear portion of said jaw having an inclined guide-face, a coupling tongue to be attached to the trailer and extending substantially horizontally forward, said tongue having an upwardly extending spur adapted to engage the guide-face and lift the jaw, said jaw having means beyond the inclined face for engaging the said spur and permitting the jaw to fall by gravity back to its normal position, said means co-operating with the spur thereafter to prevent the withdrawal of the tongue, an arm rotatably mounted on said frame above the movable jaw, an operating lever for moving said arm to and from an obstructive position with reference to said jaw, and means for locking the same in the path of the jaw to prevent the jaw from being lifted accidentally after it has dropped into engagement with the spur.

In testimony whereof, he has hereunto set his hand.

WILLIAM H. SARGENT.